3,459,721
DIALKYLALUMINUM ACETYLACETONATE
POLYMERIZATION CATALYSTS
Irving Kuntz, Westfield, and Wolfram R. Kroll, Linden, N.J., assignors to Esso Research and Engineering Company, a corporation of Delaware
Filed Oct. 10, 1966, Ser. No. 585,702
Int. Cl. C08g 23/14, 23/06
U.S. Cl. 260—88.3            7 Claims

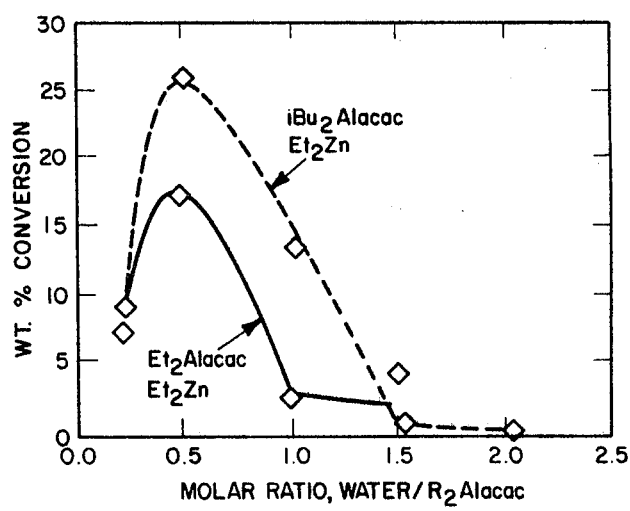

ABSTRACT OF THE DISCLOSURE

Epoxy compounds polymerized with a catalyst consisting of (a) pure dialkyl aluminum acetylacetonate in which the alkyl group contains one to eight carbon atoms, (b) dialkyl zinc or cadmium in which the alkyl group contains one to ten carbon atoms, and (c) $H_2O$.

---

This invention relates to a new process for polymerizing epoxy compounds, such as oxiranes and oxetanes, and more particularly to an improved process of polymerizing and copolymerizing oxiranes and oxetanes with a catalyst consisting essentially of (1) a pure dialkyl aluminum acetylacetonate; (2) a dialkyl zinc or dialkyl cadmium; and (3) water.

It is well known that epoxides can be polymerized by means of a dialkyl aluminum acetylacetonate or other organoaluminum compound which has been reacted with water.

In accordance with the present invention it has been found that increased yields of polymer, higher molecular weight polymers and more efficient utilization of catalyst can be obtained by the use of a catalyst system consisting essentially of: (1) a pure dialkyl aluminum acetylacetonate; (2) dialkyl zinc or dialkyl cadmium; and (3) water.

The dialkyl aluminum acetylacetonate and dialkyl zinc or cadmium are each used in the following amounts: 0.1 to 10 mole percent of total monomer, preferably 0.1 to 5 mole percent. The molar ratio of dialkyl zinc or cadmium to dialkyl aluminum acetylacetonate ranges between 0.1 and 10, preferably between 0.2 to 4.

The molar ratio of water to dialkyl aluminum acetylacetonate ranges between 0.1 to 1.5, preferably 0.4 to 1.0, with the best results being obtained at a ratio of 0.5. By carrying out the polymerization in accordance with this invention it has been found that the conversion to polymer and/or yield are greatly improved over the process where no dialkyl zinc is used and in most cases a much higher molecular weight polymer in also obtained.

The oxiranes and oxetanes which can be homopolymerized or copolymerized with a second oxirane or oxetane include ethylene oxide, propylene oxide, epichlorohydrin, epibromohydrin or any 1-olefin epoxide generally, oxetane (trimethylene oxide), 2,2-bis - (chloromethyl) - oxetane, styrene oxide, allyl glycidyl ether, butadiene monoxide, 1,2-epoxy-5-hexene, glycidyl methacrylate, or other epoxides containing olefinic unsaturation, etc.

As pointed out above, any of these monoepoxides may be homopolymerized or any mixture of two or more may be copolymerized. A particularly suitable copolymer is the terpolymer formed by copolymerizing a mixture of 40–90 mole percent of epichlorohydrin, 10 to 60 mole percent of propylene oxide (or ethylene oxide) and 1–10 mole percent of allylglycidylether. Such a terpolymer when measured by X-ray techniques is 2–15%, mostly 3–10%, crystalline. When a 2-gram sample is extracted continuously with boiling acetone in a Kumagawa apparatus it is found to be 80–90% insoluble.

The dialkylaluminum acetylacetonate can be prepared by distillation from the reaction mixture by reacting aluminum-tris-acetylacetonate with a trialkyl aluminum in a solvent at room temperature in accordance with the following equation:

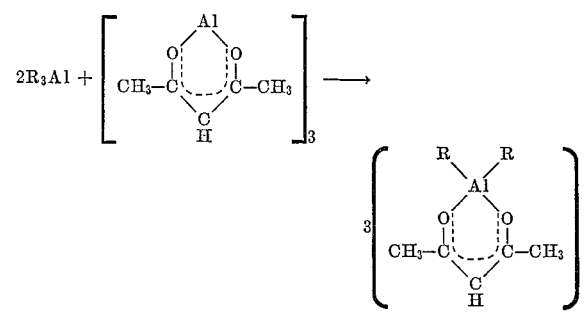

where R may be any alkyl group, e.g. from 1 to 10 carbon atoms.

It may also be prepared by adding a solution of 2,4-pentanedione to a solution of trialkyl aluminum as indicated in the following equation:

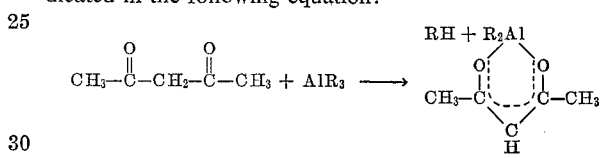

The alkyl group R in the dialkylaluminum acetylacetonate may contain anywhere from 1 to 8 carbon atoms. The alkyl group in the dialkyl zinc or cadmium may range between 1 and 10 carbon atoms. Particularly suitable compounds are dimethyl, diethyl, dipropyl and diisobutyl aluminum acetylacetonate and dimethyl, diethyl and dibutyl zinc or cadmium.

The third component of the catalyst system, water, appears to be unique. Alcohols, glycols, amines, and mercaptans have been tested and found to be ineffective.

The polymerization reaction may be carried out by any desired mens, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions may be used, as, for example, aromatic hydrocarbons such as benzene, toluene, etc., or saturated aliphatic hydrocarbons and cycloaliphatic hydrocarbons such as n-heptane, cyclohexane, etc., and halogenated hydrocarbons as, for example, chlorobenzene, or haloalkanes such as methyl chloride, methylene chloride, chloroform, carbon tetrachloride, ethylene dichloride, etc. Other types of solvents such as ethers, diethyl ether, dioxane, etc., may also be part of the solvent mixture. Obviously, any mixture of such diluents may be used and in many cases is preferable.

The polymerization process in accordance with this invention may be carried out over a wide temperature range and pressure. Usually, it will be carried out at a temperature from about —20° C. up to about 150° C., preferably from about 0° C. to about 80° C. Usually, the polymerization process will be carried out at autogenous pressure, but superatmospheric pressures up to several hundred pounds may be used if desired.

The contact times may range between 0.1 and 100 hours, preferably between 0.2 and 50 hours. The following examples exemplify the improved results that may be obtained on polymerizing epoxides in accordance with this invention. All parts and percentages are by weight, unless otherwise indicated, as will be seen from these examples, the process of this invention makes it possible not only to obtain greatly improved yields of polymer, but also to select the proper conditions to prepare a polymer of any desired molecular weight. The molecular weight of the polymers produced in these examples is shown by the inherent viscosity. By this term is meant the $1n\ (\eta/\eta_0)/C$ when $\eta$ is the viscosity of the polymer solution, $\eta_0$ is the viscosity of the pure solvent and C is the concentration. For most measurements the concentration of polymer was 0.1 g./deciliter. Unless otherwise noted the measurement was made in 1-chloronaphthalene at 135° C.

Example 1

A series of terpolymers was prepared by copolymerizing 0.2 mole epichlorohydrin, 0.1 mole propylene oxide, and 0.018 mole allylglycidyl ether in 50 ml. benzene in the presence of various proportions of diisobutylaluminum acetylacetonate, water and diethylzinc. The following data were obtained.

TABLE I

| Run | 1 | 2 | 3 | 4 | 5 | 6 |
|---|---|---|---|---|---|---|
| Diisobutylaluminum acetylacetonate, mmoles | 3.6 | | 3.6 | | 3.6 | 3.6 |
| Water, mmoles | | 1.8 | 1.8 | 1.8 | | |
| Et$_2$Zn, mmoles | | 3.6 | | 3.6 | 3.6 | 3.6 |
| Percent conversion to polymer | 0 | 0 | 5 | 0 | 26 | 3 |
| Inherent viscosity | | | 1.43 | | 4.15 | 2.12 |

The above data show that the catalyst system of the present invention gives greatly improved yields of polymer having a much higher molecular weight (Run 5) as compared with those runs in which the diethylzinc is omitted (Run 3) and the water is omitted (Run 6). No polymer is obtained in the absence of the dialkyl aluminum acetylacetonate (Run 4) or by using it or the diethylzinc alone (Runs 1 and 2).

The terpolymer of Run 5 contained 20% acetone soluble material after extracting in a Kumagawa apparatus for forty-eight hours.

Example 2

Experiments were carried out to polymerize epichlorohydrin (0.2 mole), propylene oxide (0.1 mole) and allylglycidylether (0.018 mole) in 50 ml. of benzene. Two systems were studied: one where 3.6 mmole of i-Bu2 aluminum acetylacetonate, 3.6 mmole diethyl zinc and varied amounts of water were used; the other where 3.6 mmole Et$_2$ aluminum acetylacetonate, 3.6 mmole diethyl zinc and varied amounts of water were used. The polymerizations were carried out at 50° C. for twenty hours. The results are shown in FIGURE 1.

The data in the drawing show the critical nature of the ratio of water to dialkylaluminum acetylacetonate, and clearly indicate that at a molar ratio of water to dialkylaluminum acetylacetonate of 0.5 highest yields of polymer are obtained.

Example 3

Terpolymers of epichlorohydrin (ECH), propylene oxide (PO), and allylglycidyl ether (AGE) were prepared using the catalyst of Run 5 of Example 1 and varying the amount of allylglycidylether used between 1 and 5%. The following data were obtained:

TABLE II.—PREPARATION OF ECH-PO-AGE TERPOLYMERS WITH VARIED AMOUNTS OF AGE

| Run | 1 | 2 | 3 | 4 |
|---|---|---|---|---|
| ECH: | | | | |
| Grams | 138 | 138 | 138 | 736 |
| Mole percent | 66 | 65 | 64 | 63 |
| PO: | | | | |
| Grams | 43 | 43 | 43 | 232 |
| Mole percent | 33 | 33 | 32 | 32 |
| AGE: | | | | |
| Grams | 2.6 | 5.2 | 10.7 | 82 |
| Mole percent | 1 | 2 | 4 | 5 |
| Benzene, ml | 281 | 281 | 281 | 1,500 |
| Benzene, ml./moles monomers | 124 | 122 | 120 | 118 |
| i-Bu$_2$Alacac, mmoles | 27 | 27 | 27 | 144 |
| Et$_2$Zn, mmoles | 27 | 27 | 27 | 144 |
| Water, mmoles | 13.5 | 13.5 | 13.5 | 72 |
| Polymer yield, g.[1] | 97 | 122 | 113 | 353 |
| Wt. percent conversion | 53 | 66 | 59 | 33 |
| Inherent viscosity [2] | 5.12 | 3.74 | 1.91 | 2.69 |
| Solubility in acetone, percent [3] | | | | 15 |
| X-ray crystallinity | | 8 | 6 | 3.5 |
| Tensile, p.s.i.[4] | 2,100 | 2,810 | 3,015 | 2,890 |
| Modulus/300% p.s.i. | 615 | 1,050 | 1,475 | 1,645 |
| Elongation, percent | 820 | 665 | 585 | 545 |
| Wt. percent swell | 12 | 10 | 10 | 10 |
| ASTM #3 oil, 100° C | | | | |

[1] Polymerization was carried out at 50° C. for twenty hours.
[2] In 1-chloronaphthalene at 135° C.
[3] Determined on a 2 g. sample in a Kumagawa apparatus at the bioling point of acetone for forty-eight hours.
[4] Recipe: Rubber 100, SAF black 50, PBN 0.5, stearic acid 1, DOP 15, ZnO 5, Sulfur 0.75, Tellurac 1.25, Altax 1. Cure: 307° F., forty minutes.

In every case the polymers formed were elastomers which could be vulcanized to high quality vulcanizates, and which were oil and solvent resistant as indicated by the relatively small weight percent swell in ASTM #3 oil at 100° C. This compares with a value of 55% for neoprene W, a moderately oil-resistant rubber, and 6% for Paracril C, a highly oil-resistant rubber, in comparable vulcanizates.

The X-ray data show that the terpolymers prepared have amounts of crystallinity between 2 and 15%, generally 3 to 10%. A two gram sample extracted continuously in a Kumagawa apparatus was found to be 80 to 90% insoluble when extracted by acetone at its boiling point.

Example 4

Epichlorohydrin was copolymerized with allylglycidylether using the catalyst of this invention, and the results compared with an experiment in which the diisobutylaluminum acetylacetonate is omitted. The following data were obtained:

COPOLYMERIZATION OF EPICHLOROHYDRIN *

| Run | 1 | 2 |
|---|---|---|
| Diisobutylaluminum acetylacetonate, mmoles | 7.2 | None |
| Water, mmoles | 3.6 | 3.6 |
| Diethylzinc, mmoles | 7.2 | 7.2 |
| Yield of Polymer: [1] | | |
| Ether, insoluble, percent | 51 | None |
| Ether, soluble, percent | 3 | None |

* Monomer feed is epichlorohydrin containing 6 mole percent allylglycidylether. Solvent is benzene, 2 volumes/volume monomers.
[1] After polymerization at 50° C. for twenty hours.

Run 1 of the foregoing table shows that when diethylzinc was used as the cocatalyst, the yield of undesirable ether soluble copolymer is very low. The data in column 2 show that diethylzinc-water is inactive for the copolymerization of epichlorohydrin with allylglycidylether.

Example 5

A terpolymer from 60 moles of epichlorohydrin, 35 moles of propylene oxide and 5 moles of allylglycidylether in the feed was prepared in accordance with the procedure of Example 1. The product was compounded with an ethylene, propylene, diolefin elastomer (EPDM) containing 55 wt. percent ethylene, 2.6 wt. percent unsaturation and a Mooney viscosity, 60–65 ML 1+8 (260° F.), using the following recipe:

| | Wt. percent |
|---|---|
| Polymer blend | 100 |
| SRF black | 60 |
| Stearic acid | 1 |
| ZnO | 5 |
| S | 1.5 |
| Tuads | 1.5 |
| Captax | 0.5 |

The following results were obtained:

TABLE III.—ECH-PO-AGE TERPOLYMER BLENDS WITH EPT

| Compound Number | 1 | 2 | 3 | 4 |
|---|---|---|---|---|
| ECH terpolymer | 100 | 75 | 50 | |
| EPT | 25 | 50 | 100 | |
| Vulcanizate Properties: | | | | |
| Tensile, p.s.i | 2,215 | 1,870 | 1,900 | 2,030 |
| Modulus (300%), p.s.i | | | 1,680 | 2,030 |
| Elongation, percent | 210 | 265 | 375 | 305 |
| Shore A hardness | 79 | 81 | 79 | 75 |
| Weight Percent Swell: | | | | |
| ASTM #3 oil, 70 hrs. at 212° F | 14 | 48 | 97 | 138 |
| Cyclohexane, room temp., 24 hrs | 8 | 42 | 82 | 127 |
| Wt. percent extracted in cyclohexane, 24 hrs | 1.0 | 1.4 | 1.7 | 1.4 |
| Dynamic Properties—Goodrich Flexometer:[1] | | | | |
| Load, lbs | 20 | 20 | 15 | 15 |
| Percent Static compression | 4.9 | 3.8 | 3.4 | 4.2 |
| Percent Initial dynamic compression | −9.9 | −9.8 | −13.0 | −13.0 |
| Percent dynamic drift | 0.8 | 6.1 | 5.8 | 2.0 |
| Temperature increase, ° C | 12 | 27 | 22 | 13 |
| Percent permanent set | 1.5 | 6.9 | 6.4 | 2.8 |
| Pellet examination | (2) | (3) | (2) | (2) |

[1] Goodrich pellets cured 25 minutes at 320° F. Test was carried out at 100° C. for 30 minutes, ¼ inch stroke, 30 strokes/sec.
[2] Solid.
[3] One pinhole in center.

Example 6

The epichlorohydrin terpolymer of Example 5 was co-vulcanized with butyl rubber at 307° F. for 40 minutes using the following recipe:

| | Wt. percent |
|---|---|
| Polymer blend | 100 |
| SAF black | 50 |
| Stearic acid | 1 |
| ZnO | 5 |
| S | 0.75 |
| Altax | 1 |

The following results were obtained:

TABLE IV.—ECH-PO-AGE TERPOLYMER BLENDS WITH BUTYL RUBBER

| Compound Number | 5 | 6 | 7 | 8 |
|---|---|---|---|---|
| ECH terpolymer | 100 | 75 | 50 | |
| Butyl rubber | | 25 | 50 | 100 |
| Vulcanizate Properties: | | | | |
| Tensile, p.s.i | 3,500 | 2,715 | 2,340 | 3,095 |
| Modulus (300%), p.s.i | 2,600 | 2,375 | 1,950 | 950 |
| Elongation, percent | 445 | 375 | 410 | 630 |
| Shore A hardness | 82 | 81 | 79 | 68 |
| Weight Percent Swell: | | | | |
| ASTM #3 oil, 70 hrs. at 212° F | 18 | 48 | 95 | 224 |
| Cyclohexane, room temp., 24 hrs | 10 | 44 | 86 | 196 |
| Wt. percent extracted in cyclohexane, 24 hrs | 1.3 | 1.8 | 2.2 | 2.2 |

The data of Example 5 and 6 show that the epichlorohydrin, propylene oxide, allylglycidyl ether terpolymer made in accordance with the process of the present invention can be covulcanized with other low unsaturated elastomers such as butyl rubber and EPDM with a concomitant improvement of the oil and solvent resistance of the vulcanizate as compared to the butyl rubber and the EPDM alone.

Example 7

Several terpolymers of epichlorohydrin, propylene oxide and allylglycidyl ether were prepared in accordance with the procedure of Example 1 in which the relative amounts of monomers were varied. Each polymer was vulcanized at 300° F. for 60 minutes using the following recipe:

| | Wt. percent |
|---|---|
| Polymer blend | 100 |
| LS-HAF black | 50 |
| Zinc stearate | 1 |
| Stearic acid | 0.5 |
| NBC | 1 |
| Methyl zimate | 0.3 |
| Altax | 5 |
| ZnO | 5 |

The following data were obtained:

TABLE V

| Sample | 1 | 2 | 3 |
|---|---|---|---|
| Terpolymer Composition, mole percent: | | | |
| Epichlorohydrin (ECH) | 50 | 65 | 80 |
| Propylene oxide (PO) | 40 | 25 | 10 |
| Allylglycidylether (AGE) | 10 | 10 | 10 |
| Wt. Percent Cl | 19 | 24 | 29 |
| Inherent viscosity [1] | 2.7 | 4.4 | 2.5 |
| Vulcanization: | | | |
| Tensile, p.s.i | 2,500 | 3,700 | 2,150 |
| Modulus, 300%, p.s.i | 750 | 1,350 | 2,025 |
| Elongation, percent | 660 | 610 | 315 |
| Wt. Percent Swell: | | | |
| Benzene/cyclohexane 1:1, room temp | 140 | 80 | 50 |
| MEK, room temp | 170 | 130 | 105 |
| ASTM #3 oil, 100° C.[2] | 35 | 20 | 10 |

[1] In 1-chloronapthalene at 135° C.
[2] Compare with neoprene W—55%, and Paracril C (35% AN)—6% in this test in 50 phr. black compounds.

The above data show that the solvent resistance can be controlled by varying the composition of the terpolymer, the product containing the most epichlorohydrin having the greatest resistance to solvents as indicated by the lowest weight percent swell in equal mixtures of benzene and cyclohexane.

Example 8

Epichlorohydrin (0.2 mole), propylene oxide (0.1 mole) and allylglycidylether (0.018 mole) were mixed with 50 ml. of benzene. Diethylaluminum acetylacetonate (3.6 mmoles), water (1.8 mmoles) and diethyl cadmium (3.6 mmoles) were then added to the monomer solution and the sample container was then placed in a bath at 50° C. for twenty hours.

The polymer mass was then cut up and stirred with 800 ml. of methanol for 2.5 hours, the methanol then decanted and the polymer added to boiling water. The polymer was then dried in the vaccum oven and gave 4.2 g. of elastomeric product. The inherent viscosity of this material when measured in 1- chloronaphthalene at 135° C. would be greater than 1. Evaporation of the methanol solution used in polymer isolation showed that no methanol soluble polymer had been produced.

In another experiment an equal molar amount of diisobutylaluminum acetylacetonate was substituted for the diethyl derivative and the same yield of polymer was obtained.

Example 9

0.32 mole of epichlorohydrin was polymerized in 50 ml. of benzene at 50° C. for twenty hours using the catalyst system of this invention. The following data were obtained:

HOMOPOLYMERIZATION OF EPICHLOROHYDRIN*

| Run | 1 | 2 |
|---|---|---|
| i-Bu$_2$Alacac, mmoles | 3.6 | 3.6 |
| Water, mmoles | 1.8 | 1.8 |
| Et$_2$Zn, mmoles | 3.6 | None |
| Polymer yield, wt. percent | 72 | 6 |
| Inherent viscosity | 3.26 | 2.98 |
| Solubility in boiling acetone (Kumagawa) | 11 | |

*Polymerization of 0.32 mole of ECH in 50 ml. benzene was carried out at 50° C. for twenty hours.

The above data show that the presence of dialkylzinc in the catalyst system is necessary to obtain high yields of polymer.

Example 10

Propylene oxide (0.36 mole) in 50 ml. of benzene was treated with i-Bu$_2$Alacac (3.6 mmoles), Et$_2$Zn (3.6 mmoles) and water (1.8 mmoles). The solution was placed in a rotating bath for twenty-two hours at 50° C. The reaction was then treated with 2 ml. of methanol, and the polymer isolated by precipitation into boiling water. After drying in the vacuum oven, 19.5 g. of poly (propylene oxide) was obtained, which showed an inherent viscosity of 2.70 when measured in benzene at 25° C.

Example 11

A solution of trimethylaluminum (0.64 mole) in benzene was added at ambient temperature to a solution of aluminum-tris-acetylacetonate (0.3 mole) in benzene. After removal of the benzene solvent the metal organic product was distilled at 82° C./15 mm. (105 g.). The dimethylaluminum acetylacetonate had a melting point of 28–29° C. Analysis by NMR, IR, molecular weight, as well carbon, hydrogen and aluminum analysis agreed with the structure of a dimethylaluminum acetylacetonate.

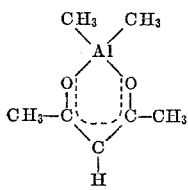

Example 12

A solution of tri-isobutylaluminum (0.3 mole) in 130 ml. benzene was slowly added under stirring to a solution of aluminum-tris-acetylacetonate (0.16 mole) in 250 ml. benzene. Subsequently, the benzene was removed at reduced pressure. The product was distilled in high vacuo at 39° C./.008 mm. (87 g.). Aluminum analysis, NMR and IR analysis agree with the structure of a diisobutylaluminum acetylacetonate. Molecular weight determination in benzene shows that the product is monomeric.

Example 13

A solution of 84.8 g. aluminum-tris-acetylacetonate was prepared by addition of 400 ml. benzene. To this was added slowly a solution of 57.1 g. triethylaluminum in benzene at ambient temperature. After the reaction the benzene was removed in vacuo. The reaction product was distilled at a bath temperature of 88° C. (boiling point 72° C. at 3.5 mm.). The distillate was identified by analysis (percent Al, NMR IR) as diethylaluminum acetylacetonate. The yield of the distilled, pure diethylaluminum acetylacetonate was 62%.

The nature of the present invention having thus been fully set forth and examples of the same given, what is claimed as new, useful and unobvious and desired to be secured by Letters Patent is:

1. The process of polymerizing epoxy compounds which comprises contacting at least one of said epoxy compounds with a catalyst composition consisting essentially of:
   (1) substantially pure dialkylaluminum acetylacetonate in which the alkyl group contains 1 to 8 carbon atoms,
   (2) a dialkyl metal chosen from the group consisting of dialkylzinc and dialkyl cadmium in which the alkyl group contains 1 to 10 carbon atoms, and
   (3) water, wherein:
      (a) the dialkyl metal and the dialkylaluminum acetylacetonate are each between 0.1 and 10 mole percent based on monomers,
      (b) the molar ratio of dialkyl metal to dialkylaluminum acetylacetonate is within the range of 0.1 to 10, and
      (c) the molar ratio of water to dialkylaluminum acetylacetonate is within the range of 0.1 to 1.5.

2. The process of claim 1 in which the dialkylaluminum acetylacetonate is diisobutylaluminum acetylacetonate and the dialkyl metal is diethyl zinc.

3. The process of claim 1 in which the dialkylaluminum acetylacetonate is dissobutylaluminum acetylacetonate and the dialkyl metal is diethyl cadmium.

4. The process of claim 2 in which the epoxy compounds being polymerized are mixtures of 40–90 mole percent of epichlorohydrin, 10–60 mole percent of propylene oxide and 1–10 mole percent of allylglycidyl ether.

5. A polymerization catalyst consisting essentially of a mixture of dialkylaluminum acetylacetonate, a dialkyl metal chosen from the group consisting of dialkyl zinc and dialkyl cadmium, and water in which the molar ratio of dialkyl metal to dialkylaluminum acetylacetonate is in the range of 0.1 to 10 and the molar ratio of water to dialkylaluminum acetylacetonate is 0.1 to 1.5.

6. The catalyst composition of claim 5 in which the dialkylaluminum acetylacetonate is diisobutylaluminum acetylacetonate and the dialkyl metal is diethylzinc.

7. The catalyst composition of claim 5 in which the dialkylaluminum acetylacetonate is diisobutylaluminum acetylacetonate and the dialkyl metal is diethyl cadmium.

References Cited

UNITED STATES PATENTS

| | | |
|---|---|---|
| 3,231,551 | 1/1966 | Herold et al. |
| 3,280,045 | 10/1966 | Vandenberg. |
| 3,285,893 | 11/1966 | Vandenberg. |
| 3,379,660 | 4/1968 | Hsieh. |
| 3,384,603 | 5/1968 | Elfers. |

HARRY WONG, Jr., Primary Examiner

U.S. Cl. X.R.

252—431; 260—2, 41, 79, 80, 91, 836, 889